United States Patent [19]
Farrow

[11] 3,923,481
[45] Dec. 2, 1975

[54] TURB-O-AIR SEPARATOR
[75] Inventor: Desmond J. Farrow, North East, Md.
[73] Assignee: Turb-O-Jector, Inc., Nottingham, Pa.
[22] Filed: July 5, 1974
[21] Appl. No.: 486,228

[52] U.S. Cl. ..................... 55/398; 55/442; 55/445; 55/459; 55/510; 55/DIG. 28
[51] Int. Cl.² ........................................... B01D 45/12
[58] Field of Search ............................ 55/392–398, 55/442, 445, 452, 459, 498, 510, DIG. 28

[56] References Cited
UNITED STATES PATENTS

| | | | |
|---|---|---|---|
| 389,786 | 9/1888 | Allington et al. | 55/398 |
| 1,362,251 | 12/1920 | Kellogg | 55/DIG. 28 |
| 1,444,585 | 2/1923 | Collins | 55/459 X |
| 1,665,434 | 4/1928 | Bennett | 55/397 |
| 1,872,075 | 8/1932 | Dolza | 55/DIG. 28 |
| 2,403,830 | 7/1946 | Schneible | 55/398 |
| 2,432,757 | 12/1947 | Weniger | 55/398 X |
| 2,472,777 | 6/1949 | Putney | 55/442 X |
| 3,274,757 | 9/1966 | Wapler | 55/459 X |
| 3,792,573 | 2/1974 | Borsheim | 55/DIG. 28 |

FOREIGN PATENTS OR APPLICATIONS

| | | | |
|---|---|---|---|
| 571,222 | 8/1945 | United Kingdom | 55/397 |
| 219,057 | 7/1924 | United Kingdom | 55/452 |
| 357,296 | 12/1905 | France | 55/393 |

*Primary Examiner*—Frank W. Lutter
*Assistant Examiner*—Kathleen J. Prunner
*Attorney, Agent, or Firm*—Oblon, Fisher, Spivak, McClelland & Maier

[57] ABSTRACT

An air separator for combustion engines includes a plurality of baffles spirally disposed within a support housing and serving to conduct an airstream from a tangential intake, open to atmosphere, to an axially extending exhaust which is associated with the intake of the engine. Discharge apertures are defined within the radially inner and outer peripheral walls of said baffles, the outermost baffle and discharge aperture being open externally of the separator. In this manner, dust and dirt particles may continuously migrate about the inner convolutions of the spiral baffle and be gradually conducted to the outer convolutions thereof for discharge out of the separator through the aperture within the outermost peripheral wall of the spiral baffle.

4 Claims, 3 Drawing Figures

TURB-O-AIR SEPARATOR

BACKGROUND OF THE INVENTION

1. Field of the Invention

The present invention relates generally to air separators or cleaners, and more particularly to air separators or cleaners particularly adaptable for use in conjunction with internal combustion engines.

2. Description of the Prior Art

Various types of air separators or cleaners adaptable for use in conjunction with internal combustion engines are of course well known, the best known type probably being of the filtered variety conventionally employed in association with automobile engines wherein a filter member is disposed within the separator for entrapping the dirt and dust particles suspended within the atmospheric fraction sucked into the engine. The obvious drawback of such separators is the necessary maintenance required of such in that the filter element must be periodically cleaned or replaced. The precise time for performing such maintenance is not always apparent or able to be accurately controlled and consequently either the filters get replaced too often and prior to the proper time necessitating such an exchange or replacement whereby maintenance costs are unnecessarily increased, or to the contrary, are not changed often enough whereby the efficiency of the same is substantially reduced thereby unnecessarily increasing engine operating costs.

In order to overcome the aforementioned drawbacks, other types of air separators and cleaners have been proposed and utilized whereby the disposition of filter members therewithin has been obviated, One such type of air separator or cleaner is of the so-called dry-velocity type wherein the air for the internal combustion engine is caused to travel at relatively high velocity under the influence of the suction created within the engine cylinders. The dust and dirt particles are separated from the clean airstream as a result of centrifugal force and collected within a suitably disposed receptacle. The disadvantages of this type of separator however, in view of the use of the dust-collecting receptacle, are substantially the same as those of the filter-type separators.

A further variety of air separator and cleaner is similar to that of the dry-velocity type, the dust and dirt particles however, being automatically discharged from the separator through the external peripheral wall of the separator housing. The efficiency of this separator however is not entirely satisfactory due to the fact that as the only discharge means for the dirt and dust particles is disposed within the external or outer peripheral wall of the separator housing, dust and dirt particles which are not initially discharged therethrough are entrapped within the separator and cannot be discharged therefrom except through the separator exhaust leading to the engine intake manifold, such of course being undesirable when considering both efficiency and unimpaired operation of the engine.

SUMMARY OF THE INVENTION

Accordingly, it is an object of the present invention to provide an improved air separator and cleaner for use in conjunction with internal combustion engines.

Another object of the present invention is to provide an improved air separator and cleaner which will overcome the aforementioned drawbacks characteristic of conventional separators.

Still another object of the present invention is to provide an improved air separator and cleaner which will not require periodic maintenance and which will therefore be able to operate substantially continuously.

Yet another object of the present invention is to provide an improved air separator and cleaner which will exhibit a high degree of efficiency whereby both maintenance and operating costs will be substantially reduced.

Yet still another object of the present invention is to provide an improved air separator and cleaner which will automatically discharge the dust and dirt particles, suspended within the atmospheric fraction sucked into the separator, from the separator housing.

A further object of the present invention is to provide an improved air separator and cleaner which permits the dust and dirt particles to be recirculated within the separator so as to be ultimately discharged out of the separator housing from all portions of the housing whereby substantially all the dust and dirt particles are in fact discharged from the separator and not conducted through the separator into the engine intake manifold.

The foregoing objectives are achieved according to this invention through the provision of an air separator and cleaner which includes a housing having a substantially tangential intake fluidically connected with the ambient atmosphere and a centrally disposed, axially extending exhaust which is adapted to be connected to the intake manifold of the internal combustion engine. A plurality of baffle members are serially arranged within the housing so as to form a substantially continuous spiral baffle, the individual baffle members being arcuately overlapped and spaced from each other so as to define slots or gaps therebetween which facilitate the migration of the dust and dirt particles within and about the housing under the influence of centrifugal force created as a result of the vacuum suction within the engine cylinders and intake manifold so as to ultimately be discharged externally of the separator through the outer periphery of the housing.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views and wherein.

DETAILED DESCRIPTION OF THE PREFERRED EMBODIMENT

Figure 1:
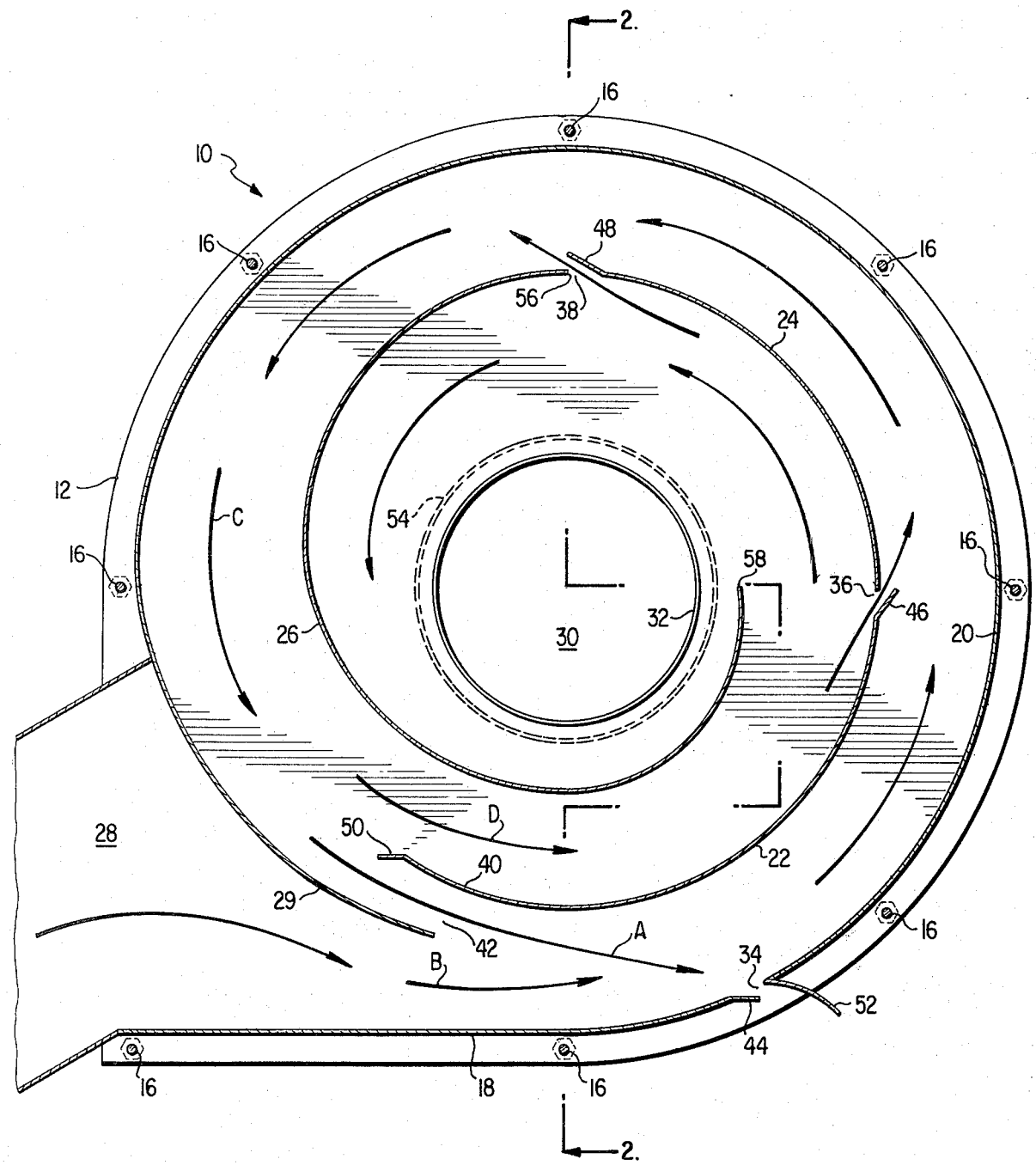
FIG. 1 is a schematic plan view of an air separator constructed according to the present invention and showing its cooperative parts.
Figure 2:
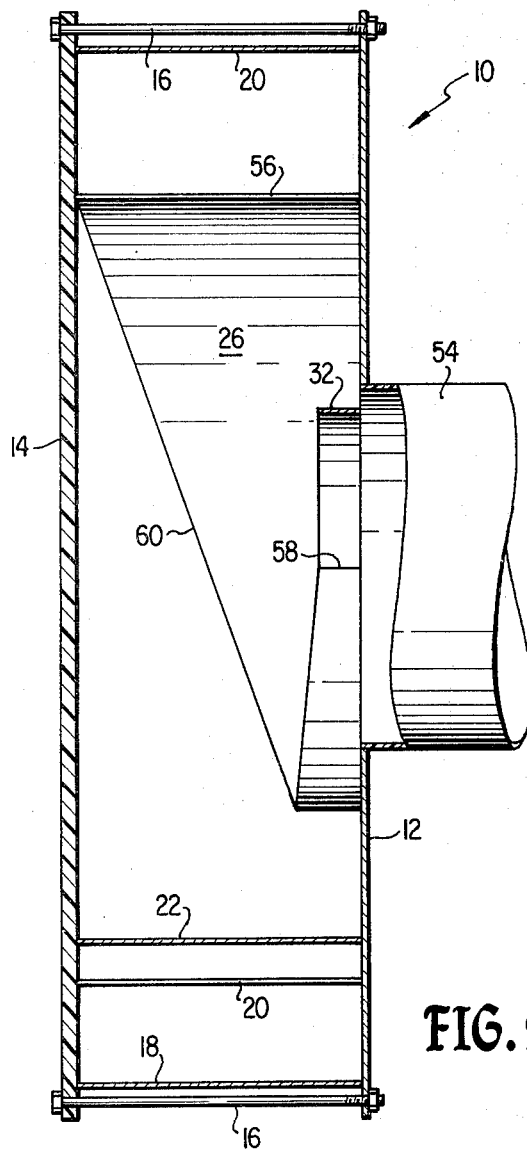
FIG. 2 is a cross-section view of the air separator as illustrated within FIG. 1 and taken along the line 2—2 of FIG. 1.

Referring now to the drawings, and more particularly to FIGS. 1 and 2 thereof, there is shown an air separator generally indicated by the reference character 10 and comprising a lower, metallic support plate 12 and an upper support plate 14 which may be made of for example, plexiglass, plates 12 and 14 being vertically spaced apart and fixedly interconnected by means of a plurality of bolts 16. The configurations of support plates 12 and 14 are identical and as seen from FIG. 1, such configuration is substantially circular except for the lower left ninety-degree sector thereof which has the configuration of a square. Bolts 16 are substantially equidistantly disposed about the peripheral areas of plates 12 and 14.

Fixedly secured to lower support plate 12 and interposed between plates 12 and 14 are a plurality of upstanding baffle members 18, 20, 22, 24 and 26, all of which are substantially arcuately configured throughout their lengths except for the portion of baffle member 18 which is disposed within the square shaped sector of the separator and which is rectilinearly configured. The baffles are serially arranged within separator 10 so as to in effect form a substantially continuous spiral baffle, and the separator is further provided with a radially disposed tubular inlet 28 which is also interposed between support plates 12 and 14 and open to the ambient atmosphere at one end thereof while being sealingly interconnected with and interposed between baffle 18 and the leading portion 29 of baffle 20 at the other end thereof.

Similarly, a central aperture 30 is defined within lower support plate 12 and an axially extending tubular outlet 32 is fixedly secured to the interior surface of lower support plate 12 and disposed about aperture 30. In this manner, the air entering the separator through inlet 28 is deflected by means of the leading portion 29 of baffle 20 so as to enter the interior portion of separator 20 in a substantially tangential direction relative thereto as defined between portion 29 and the rectilinear portion of baffle 18, whereupon the air will subsequently move radially inwardly along the spiral path defined by the baffles 18–26 and ultimately be exhausted through outlet aperture 30.

As best seen in FIG. 1, baffles 18 and 20, as well as 22, 24, and 26 are also arcuately spaced from each other so as to define therebetween tangentially extending gaps or slots 34, 36 and 38 respectively, and the leading or forward portion 29 of baffle 20 is radially spaced and arcuately disposed relative to the trailing portion 40 of baffle 22 so as to arcuately overlap portion 40, another substantially tangential passageway 42 being defined therebetween. Additional baffle portions 44, 46, and 48 extending chordwise within the separator are respectively provided at the forward portions of baffles 18, 22 and 24 in order to further define slots 34, 36 and 38 respectively and appropriately direct the air and dust particles passing therethrough as well as passing externally thereabout.

Similarly, the trailing portion 40 of baffle 22 is also provided with an auxiliary baffle 50 for further defining the particular orientation of passageway 42 and for directing the air flow and dust particles through and about such passageway, the angular orientation of passageway 42 being in fact substantially aligned with passageway 34 defined within the outer peripheral wall of the separator 10 as formed by baffles 18 and 20 whereby the dust and dirt particles suspended within the air flowing through separator 10 may be discharged therefrom as denoted by the arrow A. A deflector 52 is also provided upon the trailing portion of baffle 20 so as to be cooperatively disposed in conjunction with auxiliary baffle 44 of baffle 18 in defining exit passageway 34 whereby the exhausted dust particles are conducted away from the separator.

The external surface of lower plate 12 is provided with a centrally disposed, axially extending sleeve 54 which surrounds exhaust aperture 30 and which is adapted to be suitably connected to the internal combustion engine, not shown. Upon installation of the separator 10 upon the engine, not shown, and subsequent to the starting and during the operation thereof, the vacuum or suction conditions produced within the engine cylinders will draw air into the separator 10 through means of inlet 28. The incoming air, within which the dust and dirt particles to be separated are suspended, will be initially deflected as designated by arrow B, by means of leading portion 29 of baffle 20 so as to enter the spiral path defined within separator 10 by means of baffles 18–26.

The curved or spiral path within which the air travels causes the foreign matter carried thereby to be thrown outwardly under the influence of centrifugal force and consequently, such foreign matter will tend to be disposed adjacent the baffle walls while the clean, separated air will tend to be disposed at positions away from and intermediate the baffle walls. While a portion of the dust and dirt particles may be initially discharged through discharge opening 34 within the outer peripheral wall of the separator, the remaining portion of foreign matter will traverse the spiral course defined by baffles 22–26.

As the foreign matter is continuously being thrown radially outwardly so as to be disposed adjacent the baffle walls while the cleaned and separated air, which is a lighter fraction than that of the foreign matter, is continuously drawn radially inwardly, the airstream will traverse the path defined for example between baffles 20 and 26 and approach passageway 42 as shown by arrow C. The cleaned and separated air will thus tend to enter the next succeeding portion of the spiral path as defined between baffles 22 and 26 the airstream being shown as arrow D, while the foreign matter will tend to enter passageway 42 so as to be conducted to exit or discharge opening 34 as shown by the arrow A.

Similarly, any foreign matter remaining suspended within the airstream traveling between baffles 22 and 26 will likewise tend to pass outwardly through slots or passages 36 and 38 while the remaining clean air fraction continues to travel toward the central exhaust passageway or aperture 30 so as to be conducted to the internal combustion engine, not shown. It will of course be further appreciated that the foreign matter exiting through passages 36 and 38 will again be thrown radially outwardly toward the inner peripheral surface of baffle 20 whereupon such matter may likewise be conducted through passageway 42 and discharge passageway 34. In this manner, foreign matter is able to be continuously discharged from radially inner, as well as radially outer, portions of the separator whereby substantially all of such foreign matter particles eventually migrate from the radially inner to the radially outer portions of the separator so as to be discharged therefrom through the discharge opening provided within the outer peripheral wall thereof.

Figure 3:
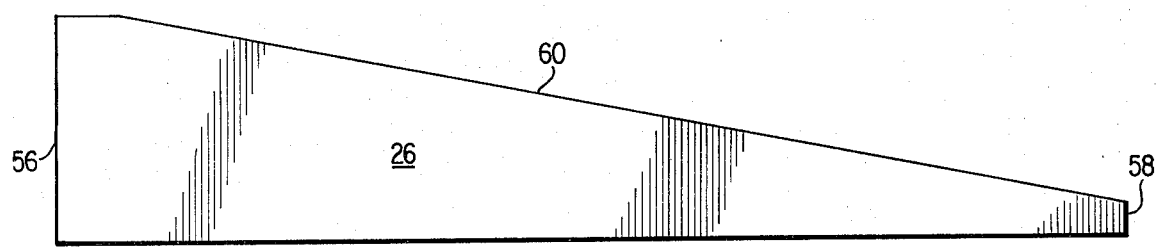
FIG. 3 is a schematic view of one of the baffle members employed within the separator.

Referring now to FIG. 3, while all of the baffle members 18–24 are of constant depth throughout the entire longitudinal extent thereof, baffle 26 has a configuration which is substantially that of a right triangle, the short upstanding leg portion 56 of which having a depth of height equal to that of baffles 18–24 while the truncated apex portion 58 has a depth or height which corresponds to that of tubular outlet 32. In this manner, the peripheral wall portions of baffle 26 serve to guide the airstream radially inwardly toward exhaust aperture 30 while the hypotenuse or axially convergent wall section 60 thereof guides the same axially toward aperture 30, the airstreams thereby being permitted to gradually flow toward aperture 30 from the spiral passageways defined between baffles 26 and 20 as well as between baffles 26 and 22 in both the radial and axial directions.

Thus, it may be seen that the air separator of the present invention has important advantages over the known prior art structures in that the separator may continuously operate in automatically separating foreign matter from the cleaned airstream to be utilized within the combustion engine, and wherein further, the operation rendered thereby is highly efficient due to the radially outward migration of foreign matter particles from all and especially the inner areas of the separator whereupon the same may be discharged from the separator while the cleaned and separated air is supplied to the engine.

Obviously, many modifications and variations of the present invention are possible in light of the above teachings. It is to be understood therefore that within the scope of the appended claims, the present invention may be practiced otherwise than as specifically described herein.

What is claimed is new and desired to be secured by letters patent of the United States is:

1. An air separator for internal combustion engines comprising:
    a first support means;
    a second support means fixedly connected to said first support means;
    intake means interposed between said first and second support means;
    exhaust means defined within one of said support means and adapted to be connected to the intake of an internal combustion engine;
    spiral baffle means secured to one of said support means and interposed between said first and second support means so as to be connected to said intake means for conducting an airstream from said intake means to said exhaust means along a apiral path;
    a plurality of discharge apertures provided within the outer and inner peripheral walls of said baffle means so as to permit serial fluid communication between the inner and outer portions of said spiral path, the aperture within said outermost peripheral wall being open externally of said separator;
    said baffle means comprising a plurality of serially arranged baffles arcuately spaced so as to define said apertures between said successive ones of said baffles, the axial extent of the innermost baffle of said serially arranged baffles being convergent toward said one of said support means and said exhaust means defined therein so as to permit the air to be exhausted to said engine through said exhaust means to be guided both radially inwardly and axially toward said exhaust means while simultaneously permitting dirt and dust particles to be conducted, under the influence of centrifugal force, radially outwardly over said innermost baffle and from that portion of said separator disposed radially within said innermost baffle towards the radially outer portions of said separator,
    wherein dirt and dust particles will be discharged out of said separator under the influence of centrifugal force by successively migrating about said inner and outer portions of said spiral path as well as serially from said inner portions of said spiral path to said outer portions of said spiral path so as to be ultimately discharged out of said separator through said aperature within said outermost peripheral wall while clean air is conducted to said exhaust means through said spiral path.

2. An air separator as set forth in claim 1, wherein: one of said discharge apertures provided upon one of said inner peripheral walls of said baffle means is rectilinearly aligned with said discharge aperture provided within said outermost peripheral wall of said baffle means,
    whereby a discharge path is defined between said one of said discharge apertures and said outermost peripheral wall discharge aperture for discharging said particles out of said separator.

3. An air separator as set forth in claim 1, further comprising:
    auxiliary baffle means connected to said spiral baffle means for defining said discharge apertures in a radially outward direction.

4. An air separator as set forth in claim 1, wherein said intake means is substantially tangentially disposed with respect to said separator while said exhaust means is disposed axially of said separator.

* * * * *